US011877366B2

(12) United States Patent
El Idrissi et al.

(10) Patent No.: US 11,877,366 B2
(45) Date of Patent: Jan. 16, 2024

(54) LIGHTING SYSTEM COMPRISING A PIXELATED LIGHT SOURCE AND A CURRENT SENSOR

(71) Applicant: VALEO VISION, Bobigny (FR)

(72) Inventors: Hafid El Idrissi, Bobigny (FR); Guillaume Zante, Bobigny (FR); Olivier Valorge, Bobigny (FR); Thomas Giraud-Sauveur, Bobigny (FR); Marjaneh Kazemi, Bobigny (FR); Sebastian Krick, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/765,049

(22) PCT Filed: Oct. 14, 2020

(86) PCT No.: PCT/EP2020/078974
§ 371 (c)(1),
(2) Date: Oct. 31, 2022

(87) PCT Pub. No.: WO2021/074259
PCT Pub. Date: Apr. 22, 2021

(65) Prior Publication Data

US 2023/0055821 A1 Feb. 23, 2023

(30) Foreign Application Priority Data

Oct. 15, 2019 (FR) ....................................... 1911433

(51) Int. Cl.
*H05B 45/3725* (2020.01)
*H05B 45/14* (2020.01)
*H05B 45/18* (2020.01)

(52) U.S. Cl.
CPC ......... *H05B 45/3725* (2020.01); *H05B 45/14* (2020.01); *H05B 45/18* (2020.01)

(58) Field of Classification Search
CPC .... H05B 45/3725; H05B 45/14; H05B 45/18; H05B 45/325; H05B 45/34; H05B 45/44
See application file for complete search history.

(56) References Cited

U.S. PATENT DOCUMENTS 6,369,952 B1 * 4/2002 Rallison ............ G02B 27/0176 359/630
9,648,679 B2 5/2017 Murakami et al.
(Continued)

FOREIGN PATENT DOCUMENTS

CN 109070745 A * 12/2018 .......... B60W 30/188
JP 2004184328 A 7/2004
(Continued)

OTHER PUBLICATIONS

European Patent Office, International Search Report (with English translation) and Written Opinion of corresponding International Application No. PCT/EP2020/078974, dated Dec. 16, 2020.
(Continued)

*Primary Examiner* — Abdullah A Riyami
*Assistant Examiner* — Syed M Kaiser
(74) *Attorney, Agent, or Firm* — Valeo Vision

(57) ABSTRACT

A lighting system for a motor vehicle with a pixelated light source having a plurality of selectively activatable elementary light sources is described. The activation of each elementary light source being controlled exclusively by a switch assigned to the elementary light source. A power converter designed to supply an electrical power to the pixelated light source and a controller designed to control the voltage supplied by the power converter and to control the switches controlling the activation of the elementary light sources. The lighting system also includes an electrical current sensor designed to measure the electrical current supplied by the power converter to the pixelated light source
(Continued)

and to transmit information relating to said measured current to the controller.

10 Claims, 1 Drawing Sheet

(56) References Cited

U.S. PATENT DOCUMENTS

| | | | | |
|---|---|---|---|---|
| 9,793,247 | B2 | 10/2017 | Yuan et al. | |
| 10,608,440 | B2 | 3/2020 | Mishrikey | |
| 2010/0320499 | A1 * | 12/2010 | Catalano | F21V 23/003 257/E33.056 |
| 2012/0274483 | A1 * | 11/2012 | Pallas | G01V 11/00 340/941 |
| 2013/0077299 | A1 * | 3/2013 | Hussell | H05B 47/10 362/249.02 |
| 2013/0181612 | A1 * | 7/2013 | Ohno | G09G 3/3406 315/297 |
| 2013/0278069 | A1 | 10/2013 | Amei et al. | |
| 2014/0128941 | A1 * | 5/2014 | Williams | A61N 5/06 315/193 |
| 2015/0326117 | A1 | 11/2015 | Tischler et al. | |
| 2016/0096467 | A1 * | 4/2016 | Murakami | H05B 45/3725 315/82 |
| 2019/0191505 | A1 * | 6/2019 | Roumier | F21S 41/151 |
| 2020/0203585 | A1 * | 6/2020 | Lopez-Julia | H01L 33/60 |

FOREIGN PATENT DOCUMENTS

| | | | |
|---|---|---|---|
| JP | 2009214789 | A | 9/2009 |
| JP | 2011523210 | A | 8/2011 |
| JP | 2013223389 | A | 10/2013 |
| JP | 2015201384 | A | 11/2015 |
| JP | 2016074235 | A | 5/2016 |
| JP | 2019527015 | A | 9/2019 |
| WO | 2019003498 | A1 | 1/2019 |

OTHER PUBLICATIONS

Japan Patent Office, Office Action (with English translation) of corresponding Japanese Patent Application No. 2022-522728, dated Aug. 4, 2023.

* cited by examiner

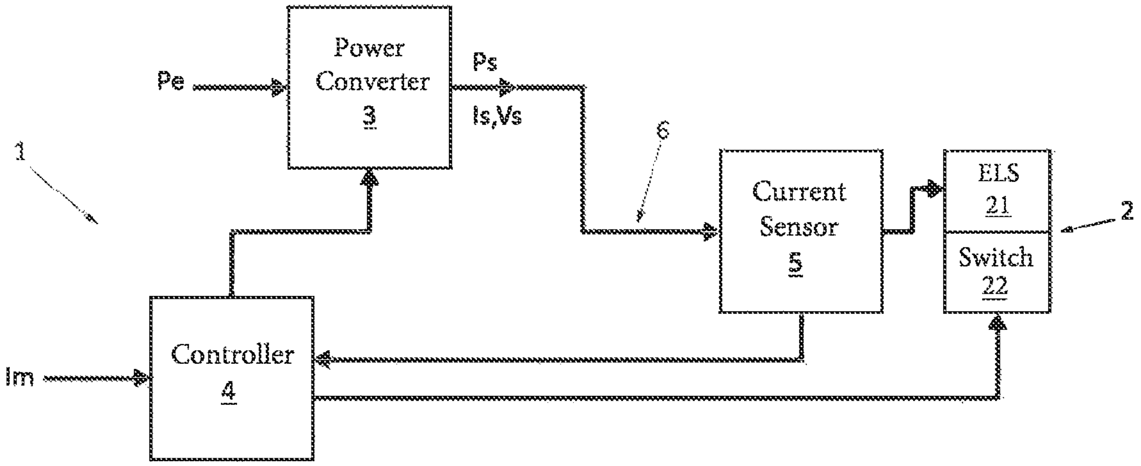
Power
Converter
3
Pe
Ps
Is,Vs
6
1
Current
Sensor
5
ELS
21
Switch
22
2
Controller
4
Im

LIGHTING SYSTEM COMPRISING A PIXELATED LIGHT SOURCE AND A CURRENT SENSOR

CROSS-REFERENCE TO RELATED APPLICATIONS

This application is filed under 35 U.S.C. § 371 U.S. National Phase of International Application No. PCT/EP2020/078974 filed Oct. 14, 2020 (published as WO2021074259), which claims priority benefit to French application No. 1911433 filed on Oct. 15, 2019, the disclosures of which are herein incorporated by reference in their entirety.

TECHNICAL FIELD

The invention relates to the field of motor vehicle lighting. More specifically, the invention relates to a motor vehicle lighting system incorporating a pixelated light source.

BACKGROUND OF THE INVENTION

In the field of motor vehicle lighting, lighting systems are known comprising enough selectively controllable elementary light sources to make it possible to perform pixelated light functions, for example containing at least 500 pixels, each pixel being formed by an elementary light beam emitted by one of the elementary light sources. This type of lighting system makes it possible for the motor vehicle to perform, for example, lighting functions of high-beam anti-dazzle type, in which some pixels of the high beam are switched off or dimmed to form a dark region around a target object not to be dazzled, such as a vehicle being followed or passed In order to produce this type of lighting system, it is known practice to employ monolithic pixelated light-emitting diodes, comprising a plurality of elementary light emitters each forming one of the elementary light sources. Each of the elementary emitters is supplied with power by a controlled current source dedicated to this emitter and which makes it possible to activate emission of a pixel or not. The set of controlled current sources is integrated into the same integrated circuit, which is, for example, placed under the elementary emitters. Due to the use of controlled current sources, this type of system has several disadvantages, namely: introducing significant electric power losses in the integrated circuit, increasing the reaction time of the pixelated light-emitting diode and increasing the surface area of silicon necessary, and therefore the cost, of the integrated circuit.

BRIEF SUMMARY OF THE INVENTION

In this context, another solution which makes it possible to overcome these problems consists in controlling each of the elementary light emitters by means of a single dedicated switch, the pixelated light source being supplied with power by means of a voltage-controlled power converter in order to deliver the electric power necessary to perform the desired light function. In this type of system, there is therefore no measuring of the electric current delivered by the power converter to the pixelated light source or of the electric current flowing within each of the elementary emitters. The use of switches instead of controlled current sources makes it possible to reduce the surface area of silicon in the integrated circuit, to increase the response time of the pixelated light source and to limit the power losses.

However, this type of lighting system forms an open-loop system and, as such, is unstable and therefore unreliable. Specifically, the characteristics of the monolithic pixelated light-emitting diode, such as, for example, the threshold voltage of the elementary emitters, can vary, in particular depending on temperature. Thus, if the electric power delivered by the power converter is not regulated, a luminous flux loss at the output of the pixelated light source or even thermal runaway can be observed. Furthermore, the pixelated light source can be remote from the power converter and therefore require a particularly long cable harness, which introduces impedance losses which therefore undermine the stability of the system.

There is thus a need to make a lighting system comprising a pixelated light source, the elementary light sources of which are exclusively controlled by a switch, more reliable. The invention falls within this context and aims to meet this need.

For these purposes, the subject of the invention is a lighting system for a motor vehicle, comprising:

a. a pixelated light source having a plurality of elementary light sources which can be activated selectively, the activation of each elementary light source being exclusively controlled by a switch dedicated to this elementary light source;
b. a power converter arranged to deliver electric power to the pixelated light source;
c. a controller arranged to control the voltage delivered by the power converter and to control the switches controlling the activation of the elementary light sources.

The invention is characterized in that the lighting system includes an electric current sensor arranged to measure the electric current delivered by the power converter to the pixelated light source and to transmit information relating to this measured current to the controller.

It will be understood that, by virtue of the invention, the controller has at its disposal information relating to the intensity of the electric current delivered by the power converter to the pixelated light source. Consequently, this information can be utilized by the controller to regulate the electric power at the output of the converter, whether to stabilize this electric power with respect to the needs of the pixelated light source, including in the event of large variations in the ambient temperature in this light source, or to compensate for impedance losses in a cable harness between the power converter and the light source.

According to the invention, what is meant by pixelated light source is any light source comprising a plurality of elementary light sources, each possibly being associated with an electro-optical element and being capable of being activated and controlled selectively to emit an elementary light beam, the luminous intensity of which is controllable. Advantageously, the pixelated light source can comprise a monolithic pixelated light-emitting diode comprising a plurality of elementary light emitters, each of the elementary emitters of the monolithic pixelated light-emitting diode forming one of the elementary light sources. For example, the plurality of elementary light emitters can be stacked on an integrated circuit into which said switches are integrated. Where appropriate, the elementary light sources can be arranged so that each elementary light beam forms a pixel and so that the set of pixels forms a pixelated light beam, for example comprising 500 pixels with dimensions of between 0.05° and 0.3°, distributed over a plurality of rows and columns, for example 20 rows and 25 columns.

Advantageously, the lighting system has no controlled current source associated with each of the elementary light sources. Advantageously again, the electric current sensor is connected between the power converter and the pixelated light source.

In one embodiment of the invention, the electric current sensor includes a Hall effect sensor. Alternatively or cumulatively, the current sensor includes a magnetoresistor, for example a tunnel effect magnetoresistor (also called a TMR sensor, for Tunnel MagnetoResistor). These types of sensors, in comparison with a resistor of shunt type, have characteristics that adequately meet the measuring needs for the envisaged type of pixelated light sources. In contrast, resistors of shunt type are not suitable because sizing them would be too complicated with respect to this need, namely measuring current intensity with low values and with high measuring accuracy.

Advantageously, the controller is arranged to modify the value of the voltage delivered by the power converter depending on said information relating to the measured current and transmitted by the electric current sensor. For example, if the measured electric current has an intensity lower than a predetermined threshold value, the controller can be arranged to require an increase in the voltage delivered at the output of the power converter, for example to guarantee a luminous flux emitted by the pixelated light source which is of constant intensity. In another example, if the measured electric current has an intensity higher than a predetermined threshold value, the controller can be arranged to require a reduction in the voltage delivered at the output of the power converter, for example to prevent thermal runaway of the pixelated light source.

In one embodiment of the invention, the lighting system can comprise a temperature sensor arranged to measure the ambient temperature in the vicinity of the pixelated light source and a memory in which the emission characteristics of the pixelated light source are stored, in particular the threshold voltages of each of the elementary light sources. Where appropriate, the controller is arranged to modify the value of the voltage delivered by the power converter depending on said information relating to the measured current and transmitted by the electric current sensor, on the ambient temperature measured by the temperature sensor and on the emission characteristics of the pixelated light source which are stored in the memory.

For example, the controller is arranged to receive an instruction for a desired pixelated light beam to be emitted by the pixelated light source and to determine a necessary electric power setpoint which must be delivered by the power converter to the pixelated light source for said desired pixelated light beam to be emitted. Where appropriate, the controller can be arranged to modify the value of the voltage delivered by the power converter depending on said information relating to the measured current and transmitted by the electric current sensor so that the electric power delivered by the power converter is substantially identical to the determined necessary electric power setpoint. For example, the controller can be arranged to receive an instruction for a desired pixelated light beam to be emitted in the form of a digital image representing a projection of said desired pixelated light beam, each point in the digital image representing, in particular, the luminous intensity of the pixelated light beam at a point in space. In this example, the controller is arranged to determine a necessary electric power setpoint which must be delivered by the power converter to the pixelated light source so that the luminous intensity of the pixelated light beam, and in particular of each of the pixels, corresponds to that of the digital image. Furthermore, the controller can be arranged to control the pixelated light source so that each light source emits a pixel corresponding to one or more points in the digital image.

In one embodiment of the invention, the controller and the power converter are arranged on a first printed circuit board, and the pixelated light source and the electric current sensor are arranged on a second printed circuit board. Where appropriate, the first printed circuit board and the second printed circuit board are connected to one other by a cable harness.

Advantageously, the controller is arranged to determine, on the basis of the information relating to the measured current and transmitted by the electric current sensor, an impedance loss in the cable harness. Advantageously again, the controller is arranged to modify the value of the voltage delivered by the power converter so as to compensate for said impedance loss in the cable harness determined by the controller.

BRIEF DESCRIPTION OF THE DRAWINGS

The present invention is now described using examples which are merely illustrative and in no way limit the scope of the invention, and on the basis of the attached illustration:

FIG. 1 shows a lighting system according to one embodiment of the invention.

DETAILED DESCRIPTION OF THE INVENTION

FIG. 1 shows a lighting system 1. The lighting system 1 includes a pixelated light source 2 able to emit a pixelated light beam. In the described example, the pixelated light source 2 is a monolithic pixelated light-emitting diode comprising a plurality of elementary light emitters 21 stacked on an integrated circuit into which a plurality of switches 22 are integrated, each switch 22 controlling the activation or the deactivation of one of the elementary light emitters 21, to which it is thus dedicated. Each of the light-emitting elements 21 forms an elementary light source which can be activated and controlled selectively and exclusively by means of the switches 22 to emit an elementary light beam, the luminous intensity of which is controllable, and thus forms a pixel of the pixelated light beam. It will be noted that the lighting system 1, and in particular the light source 2, has no controlled current source associated with each of the elementary light emitters 21.

The pixelated light source 2 can form part of a light module of the lighting system 1 and thus be associated therein with an optical element making it possible to shape the elementary light beams. For example, the light source 2 includes 500 elementary light emitters 21 distributed in an array over a plurality of rows and columns, for example 20 rows and 25 columns, each emitter being able to emit, for example in association with an optical device which is not shown, a pixel with dimensions of between 0.05° and 0.2°. The lighting system 2 can further comprise other light modules or sources, pixelated or not.

In order to make it possible to emit a pixelated light beam, the lighting system 1 includes a power converter 3, for example of DC/DC type, arranged to deliver, on the basis of electric power Pe received from an energy source of the motor vehicle such as a battery, electric power Ps to the pixelated light source 2. Furthermore, in order to control the intensity and the distribution of the pixelated light beam, the lighting system 1 further includes a controller 4 arranged to control, on the one hand, the pixelated light source 2, and more specifically each of the switches 22, and, on the other hand, the power converter 3. More specifically, the controller 4 is arranged to control and/or modify the value of the voltage Vs delivered by the power converter 3.

In order to be able to stably regulate the electric power Ps delivered by the power converter 3 to the pixelated light source 2, the lighting system 1 includes an electric current sensor 5 arranged to measure the electric current Is delivered by the converter 3 to the pixelated light source 2 and to transmit information relating to this measured current Is to the controller 4. This electric current sensor 5 includes a Hall effect sensor connected between the power converter 3 and the pixelated light source 2.

In the described example, the controller 4 and the power converter 3 are arranged on a first printed circuit board, and the pixelated light source 2 and the electric current sensor 5 are arranged on a second printed circuit board, the first printed circuit board and the second printed circuit board being connected to one other by a cable harness 6, through which the electric power Ps delivered by the converter 3 passes.

Several ways of utilizing the information relating to the electric current Is and transmitted by the sensor 5 to the controller 4 will now be described.

In the described example, the controller 4 is arranged to receive an instruction Im for a desired pixelated light beam to be emitted by the pixelated light source 2, in the form of a digital image representing a projection of said desired pixelated light beam, each point in the digital image representing, in particular, the luminous intensity of the pixelated light beam at a point in space. The controller 4 thus determines a necessary electric power setpoint which must be delivered by the power converter 3 to the pixelated light source 2 for said desired pixelated light beam to be emitted, for example so that the luminous intensity of the pixelated light beam, and in particular of each of the pixels, corresponds to that of the digital image Im. Furthermore, the controller 4 transmits an activation instruction based on the digital image Im to the switches 22 of the pixelated light source 2 in order to command the activation or deactivation of each of the elementary light emitters 21, so that the set of pixels emitted by these elementary emitters 21 forms a pixelated light beam corresponding to the digital image Im.

The controller 4 is arranged to modify the value of the voltage Vs delivered by the power converter 3 depending on said information relating to the measured current Is and transmitted by the electric current sensor 5, in particular so as to regulate the electric power Ps delivered by the converter 3 in accordance with the power setpoint determined by the controller 4. In one example, if the measured electric current Is has an intensity lower than a predetermined threshold value, the controller 4 requires an increase in the voltage Vs delivered at the output of the power converter 3, so as to guarantee a luminous flux emitted by the pixelated light source 2 which is of constant intensity. In another example, if the measured electric current Is has an intensity higher than a predetermined threshold value, the controller 4 requires a reduction in the voltage Vs delivered at the output of the power converter 3, for example to prevent thermal runaway of the pixelated light source 2.

In addition, the controller 4 can determine, on the basis of the information relating to the measured current Is, an impedance loss in the cable harness 6 and can thus modify the value of the voltage Vs delivered by the power converter 3 so as to compensate for this impedance loss in the cable harness 6.

The preceding description explains clearly how the invention makes it possible to achieve the objectives it has set itself, and in particular by proposing a lighting system which incorporates an electric current sensor measuring the current delivered by a power converter to a pixelated light source, which is controlled exclusively by switches and not by controlled current sources. It will thus be understood that the information relating to the measured current and delivered by the sensor can thus be utilized by the controller of the power converter, so as to regulate the electric power delivered to the pixelated light source.

In any event, the invention should not be regarded as being limited to the embodiments specifically described in this document, and extends, in particular, to any equivalent means and to any technically operative combination of these means. In particular, other ways of utilizing the information relating to the measured current and transmitted by the current sensor can be provided, for example by integrating into the controller a memory containing a map of the characteristics of the pixelated light source and also a temperature sensor in the vicinity of the pixelated light source. In addition, other types of current sensors, and in particular sensors comprising magnetoresistors, for example tunnel effect magnetoresistors, can be provided.

What is claimed is:

1. A lighting system for a motor vehicle, comprising:

a pixelated light source having a plurality of elementary light sources which can be activated selectively, with the activation of each elementary light source being exclusively controlled by a dedicated switch;

a power converter arranged to deliver electric power to the pixelated light source;

a controller configured to control a voltage delivered by the power converter and to control the activation of the elementary light sources by controlling the dedicated switches, with the power converter and the controller arranged on a first printed circuit board; and an electric current sensor configured to measure an electric current delivered by the power converter to the pixelated light source and to transmit information relating to the electric current to the controller, with the pixelated light source and the electric current sensor arranged on a second printed circuit board.

2. The lighting system as claimed in claim 1, wherein the electric current sensor includes a Hall Effect sensor.

3. The lighting system as claimed in claim 1, wherein the electric current sensor includes a magnetoresistor.

4. The lighting system as claimed in claim 1, wherein the controller is configured to modify the value of the voltage delivered by the power converter depending on the information relating to the measured current and transmitted by the electric current sensor.

5. The lighting system as claimed in claim 1, further comprising a temperature sensor configured to measure the ambient temperature in the vicinity of the pixelated light source and a memory in which the emission characteristics of the pixelated light source are stored, wherein the controller is configured to modify the value of the voltage delivered by the power converter depending on the information relating to the measured current and transmitted by the electric current sensor, on the ambient temperature measured by the temperature sensor, and on the emission characteristics of the pixelated light source which are stored in the memory.

6. The lighting system as claimed in claim 1, wherein the controller is configured to receive an instruction for a desired pixelated light beam to be emitted by the pixelated light source and to determine a necessary electric power setpoint which must be delivered by the power converter to the pixelated light source for the desired pixelated light beam to be emitted, and wherein the controller is configured to modify the value of the voltage delivered by the power converter depending on the information relating to the measured current and transmitted by the electric current sensor so that the electric power delivered by the power converter is substantially identical to the necessary electric power setpoint.

7. The lighting system as claimed in claim 1, wherein the first printed circuit board and the second printed circuit board are connected by a cable harness.

8. The lighting system as claimed in claim 7, wherein the controller is configured to determine an impedance loss in the cable harness responsive to the information relating to the electric current.

9. The lighting system as claimed in claim 8, wherein the controller is configured to modify the value of the voltage delivered by the power converter to compensate for the impedance loss in the cable harness.

10. The lighting system as claimed in claim 1, wherein the pixelated light source comprises a monolithic pixelated light-emitting diode including a plurality of elementary light emitters, with each of the elementary emitters of the monolithic pixelated light-emitting diode forming one of the elementary light sources.

* * * * *